United States Patent [19]

Azzaroni

[11] 4,049,142
[45] Sept. 20, 1977

[54] AUTOMATIC MACHINE FOR UNLOADING AND RELOADING OF PLATES IN CASSETTES, PARTICULARLY RADIOGRAPHS

[75] Inventor: Cesare Azzaroni, Bologna, Italy

[73] Assignee: Cesare Azzaroni, Bologna, Italy

[21] Appl. No.: 662,043

[22] Filed: Feb. 27, 1976

[30] Foreign Application Priority Data

Feb. 27, 1975 Italy .................................. 3346/75

[51] Int. Cl.² ............................................ B65G 65/04
[52] U.S. Cl. .................................... 214/301; 250/468; 271/5
[58] Field of Search .................. 214/301, 304, 309; 271/5, 64, 173; 354/312, 315; 250/468, 66, 480

[56] References Cited

U.S. PATENT DOCUMENTS

| 3,031,187 | 4/1962 | Sano et al. ............................ 271/64 |
| 3,634,687 | 1/1972 | Somerset et al. ..................... 214/309 |
| 3,888,587 | 6/1975 | Perl ...................................... 214/301 |
| 3,891,854 | 6/1975 | Hura ..................................... 214/304 |
| 3,900,405 | 8/1975 | Barlett et al. ......................... 214/304 |
| 3,913,905 | 10/1975 | Schulze ................................ 271/64 |
| 3,934,735 | 1/1976 | Schmidt ................................ 214/301 |

Primary Examiner—Lawrence J. Oresky
Attorney, Agent, or Firm—Browdy and Neimark

[57] ABSTRACT

An automatic machine receives a cassette with an exposed plate, preferably radiographic, unlocks and opens the cassette, unloads the exposed plate, reloads the cassette with a plate of appropriate size, and closes, locks and ejects the cassette. The machine can sense the size of the cassette automatically and adjust to unload and reload such cassette with the appropriate sized plate.

7 Claims, 9 Drawing Figures

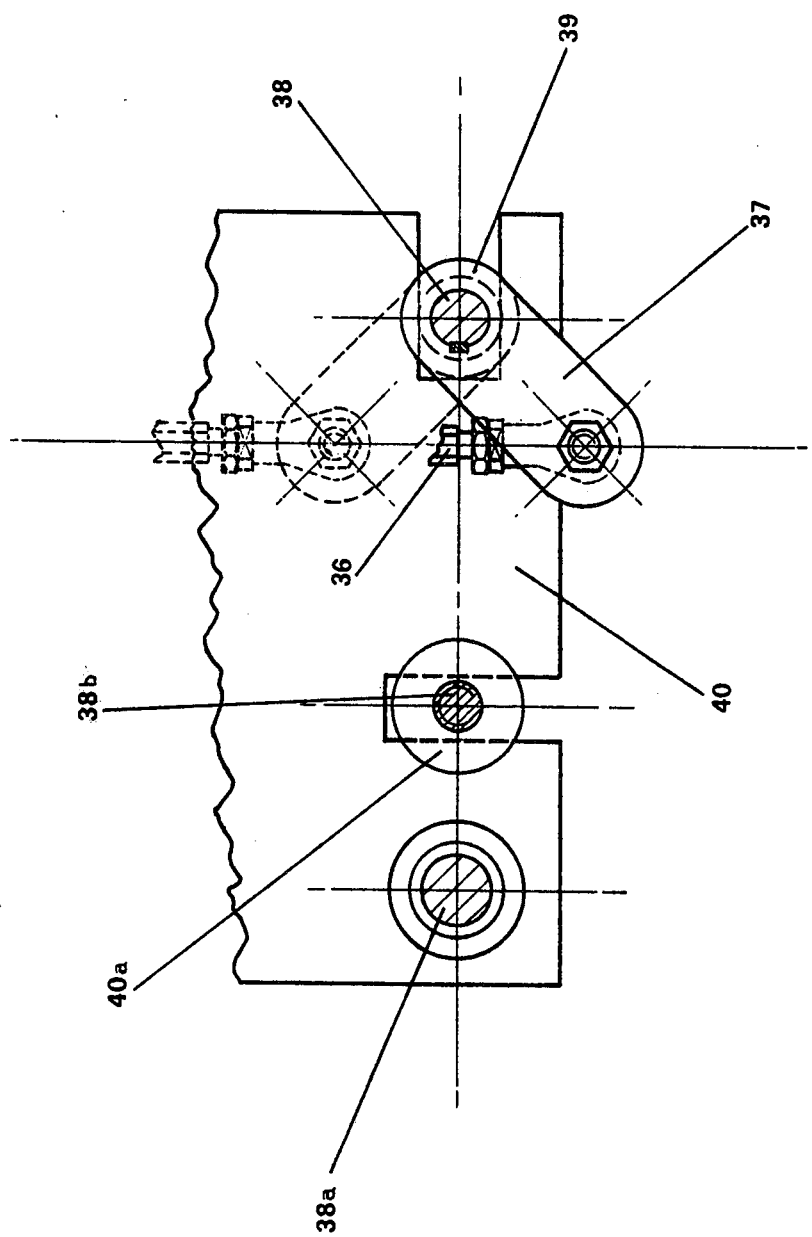

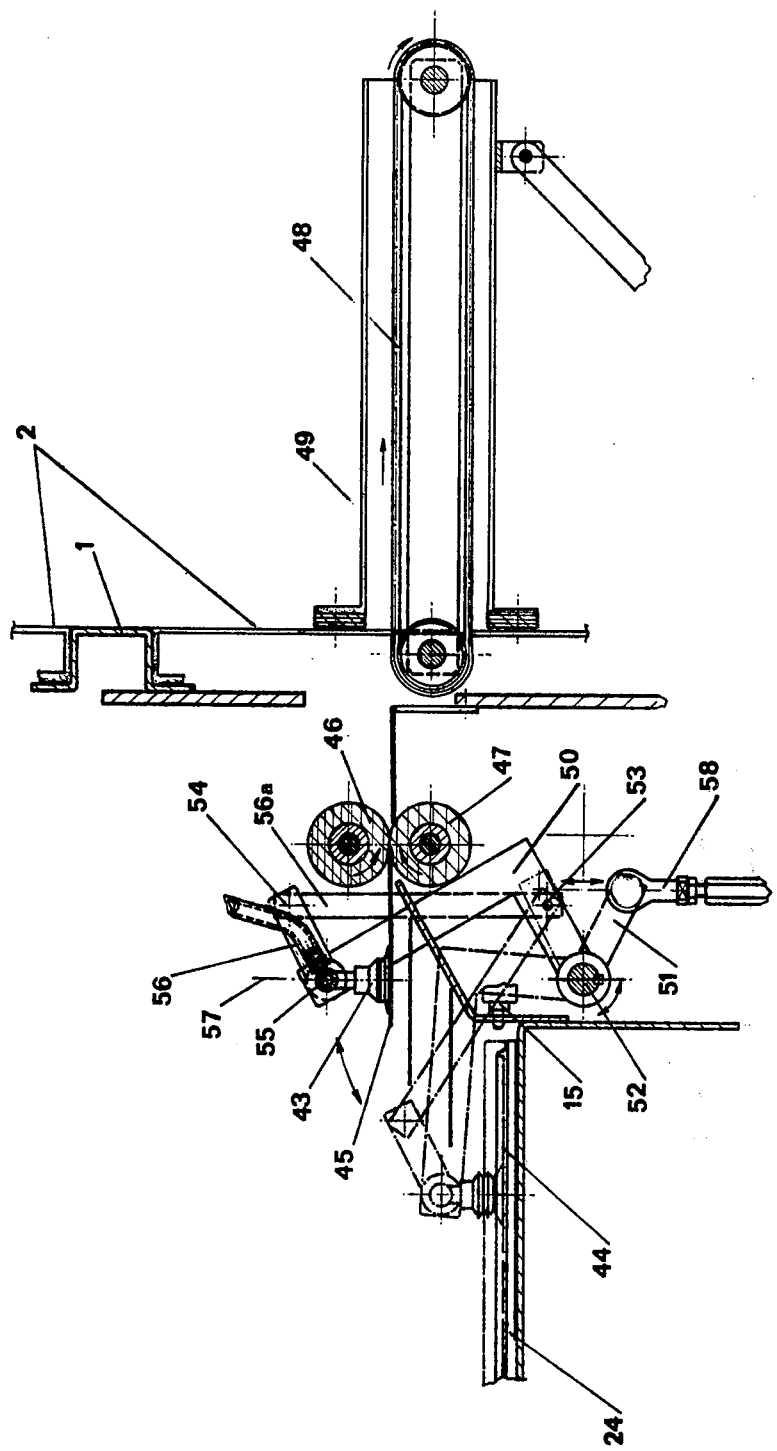

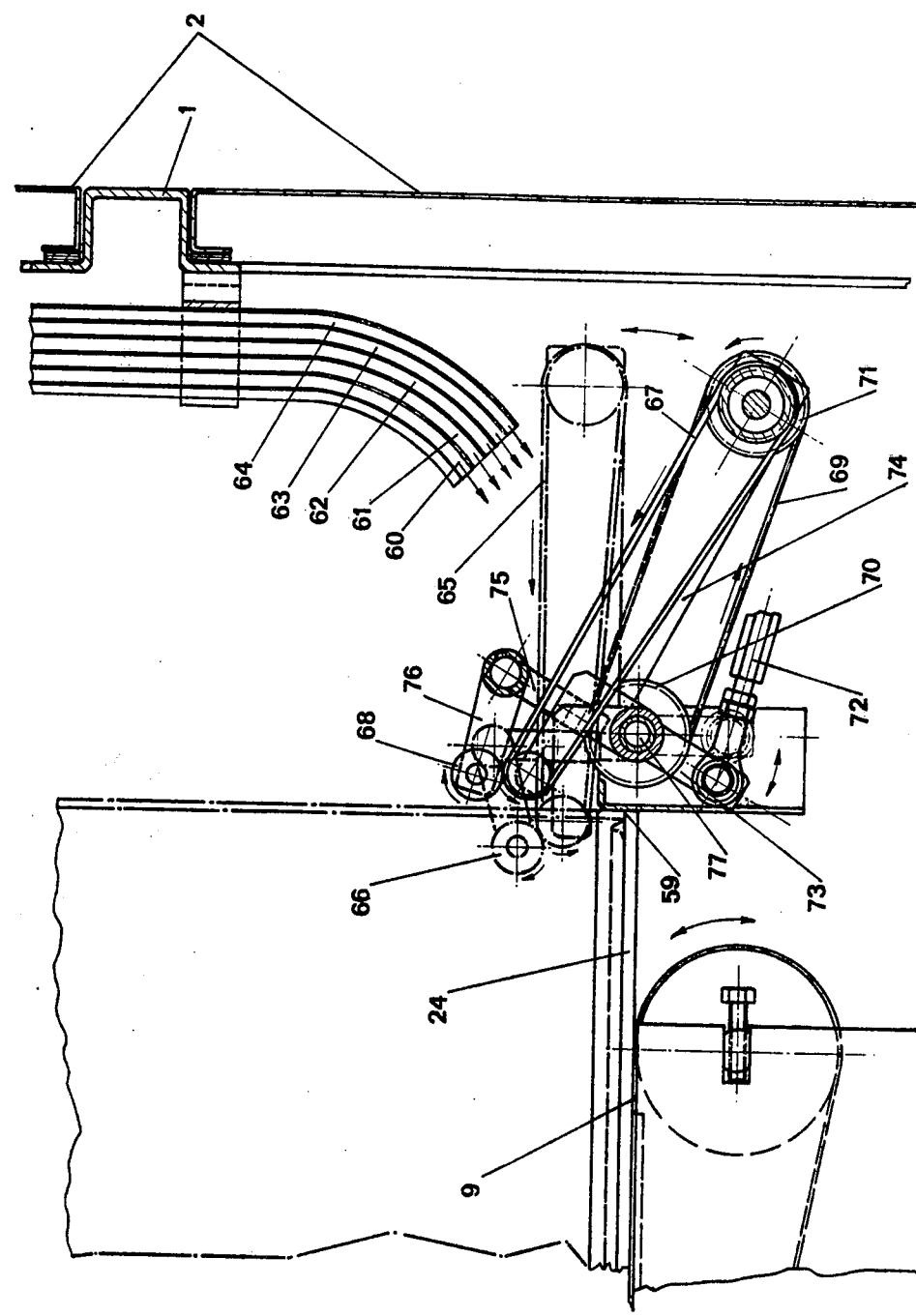

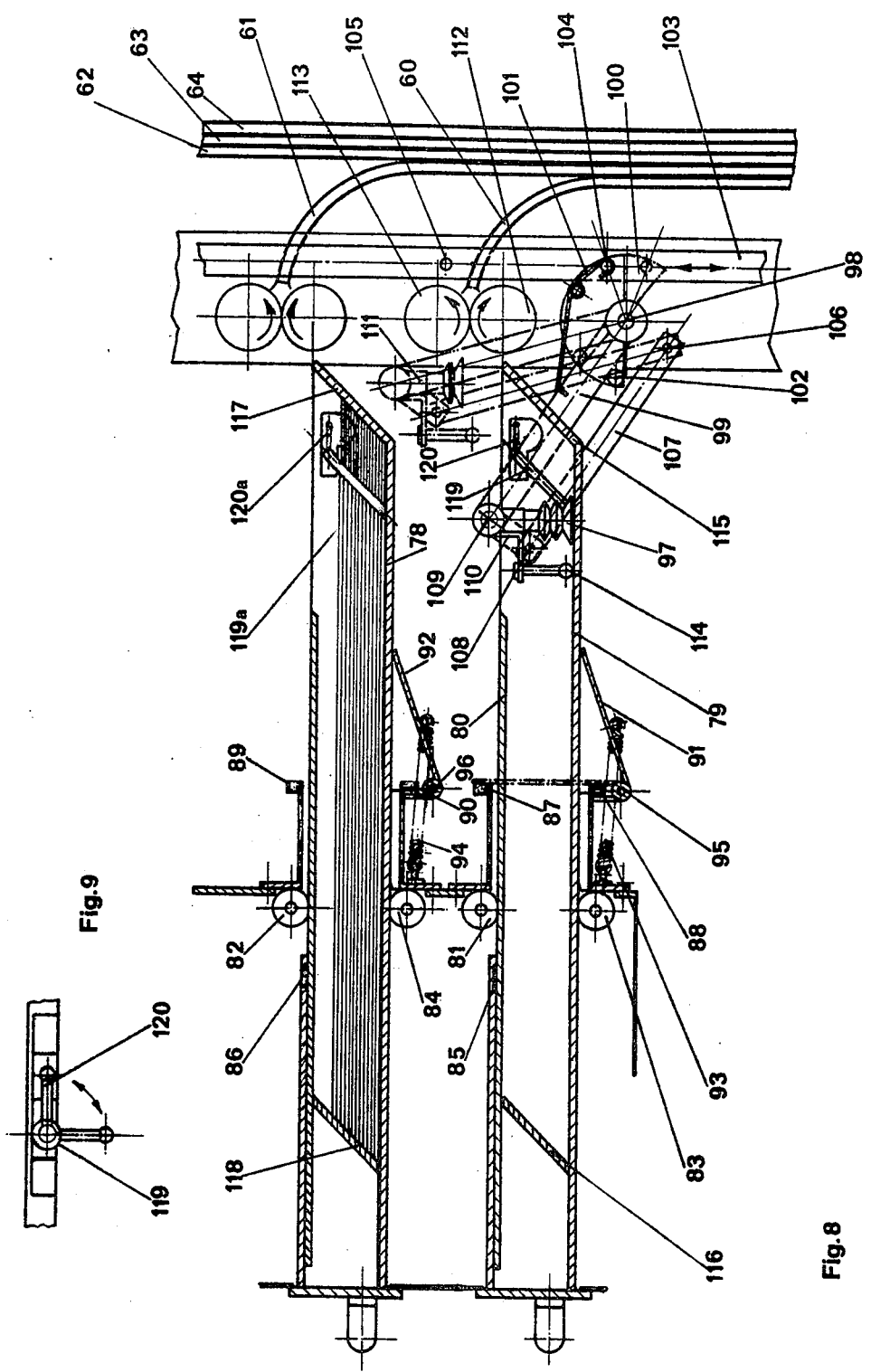

AUTOMATIC MACHINE FOR UNLOADING AND RELOADING OF PLATES IN CASSETTES, PARTICULARLY RADIOGRAPHS

FIELD OF THE INVENTION

The present invention concerns an automatic machine suitable to obtain the unloading of exposed plates and the reloading of a new plate in the cassettes, especially for radiography.

BACKGROUND OF THE INVENTION

At the present time, the unloading operations of radiographed plates from the relevant cassette and the successive reloading of such cassettes are carried out manually in the dark room, and sometimes, by means of manual controls, which allow to carry out in lighted rooms only the unloading or only the loading of the plate. Obviously, this means long working times in addition to the fact that the good result of loading and unloading of the plate, avoiding any type of deterioration or alteration of same, is entirely left to the skill of the operator.

SUMMARY OF THE INVENTION

A purpose of the present invention is to obviate the above listed inconvenience, in particular:
 to eliminate the use of the dark room for unloading and/or reloading of the cassettes;
 to eliminate completely the manual contamination of the plates, and of the screens of the cassettes by the operator; and
 to reduce the working times with consequent economy of operating costs.

Advantageously, this machine allows operation with cassettes and plates of different sizes, without having to perform any manual regulation during the operating cycle.

The machine, which is the object of the present invention, is basically characterized by the fact that it includes: one loading plane, whose surface detects the presence of a cassette, and in correspondence of which there are provided input and output stations to and from the machine for the cassettes to be unloaded and reloaded, which contain a device with hermetic protection against light, to grip and convey the cassettes inside the machine and to take them off from the machine; same is operated through sensors, which detect the presence of a cassette on the beforesaid loading plane. Moreover, there is a first conveyor, placed behind the gripping and conveying unit, to receive the entering cassette and to transfer it inside the machine, until leading it against the first stop, which is connected with the control to stop the movement of the abovesaid first conveyor and to supply the before mentioned gripping unit with the reloaded cassette during the phase of ejection of the cassette from the machine. A pushing device for the positioning of the cassette in orthogonal direction wth respect to the moving direction of same on the first conveyor, is timed with this conveyor and is operated by the controls which determine the stopping of the first conveyor. Sensors, which are placed laterally to the first conveyor at the height of a second stop for the cassette, are suited to determine the span of this pushing device and to detect the dimension of the cassette, relevant to the side of same, which reaches the stop frontally. A special device for the unlocking of the cassette, which is placed above the first conveyor and whose operation is controlled by the beforesaid sensor, is placed laterally to the first conveyor. A one device for the opening of the cassette is also placed laterally to the first conveyor, the operation of which is timed with that of the device for unlocking the cassette. The opening device acts by means of suckers on the cassette cover to obtain the rotation of same, unitl bringing it from the originally closed position into the open position of the cassette. A special device for taking off the exposed plate from inside the cassette, is timed with the beforesaid cassette opening device, and includes suckers to take the plate out of the cassette and transfer it on a second conveyor, which is placed inside a tunnel with hermetic protection against light for the output of the plate from the machine. Several magazine drawers are provided for the plates to be forwarded singly to the cassettes, from where the exposed plate had been previously taken off, and for each of them there is provided the inlet of the relevant feeding duct for these single plates to the transfer mechanism of same inside the beforesaid cassette. Means for taking off these plates singly from the magazine drawers, are placed over each drawer, with synchronized motion and are supplied with suckers to hold the plates. The take-off means are activated individually by the sensor placed laterally to the first conveyor, which detects the dimension of the cassette relevant to the side that gets frontally in touch with the second stop, and in function of the position taken by the pushing device.

BRIEF DESCRIPTION OF THE DRAWINGS

The characteristics of the machine in question will be hereafter described and illustrated with reference to a preferable but not exclusive, type of execution, which is illustrated on the drawings, where the not characterizing elements, such as kinematic motions and the moving devices to be obtained through well known techniques, have been omitted, and where:

FIG. 5 represents a lateral view of the slides and the traverse control screw (positioning of the cassette opening device);

FIG. 6 represents a frontal view of the device for the taking off of the plate from the cassette and the forwarding of same to the developer (not illustrated);

FIG. 7 represents a lateral view, with some sectional elements, of the device for the introduction into the cassette of a new plate coming from the magazine drawer;

FIG. 8 represents a lateral view, with some sectional elements, of two of the magazine drawers placed one above the other, for the plates to be introduced into the cassette by means of one of the suckers provided for taking off the plates and for their introduction into the conveying canal leading to the corresponding cassette;

FIG. 9 represents a top view of the mechanical device for keeping in the magazine drawer all the plates less the one that has to be conveyed to the cassette.

Figure 1:
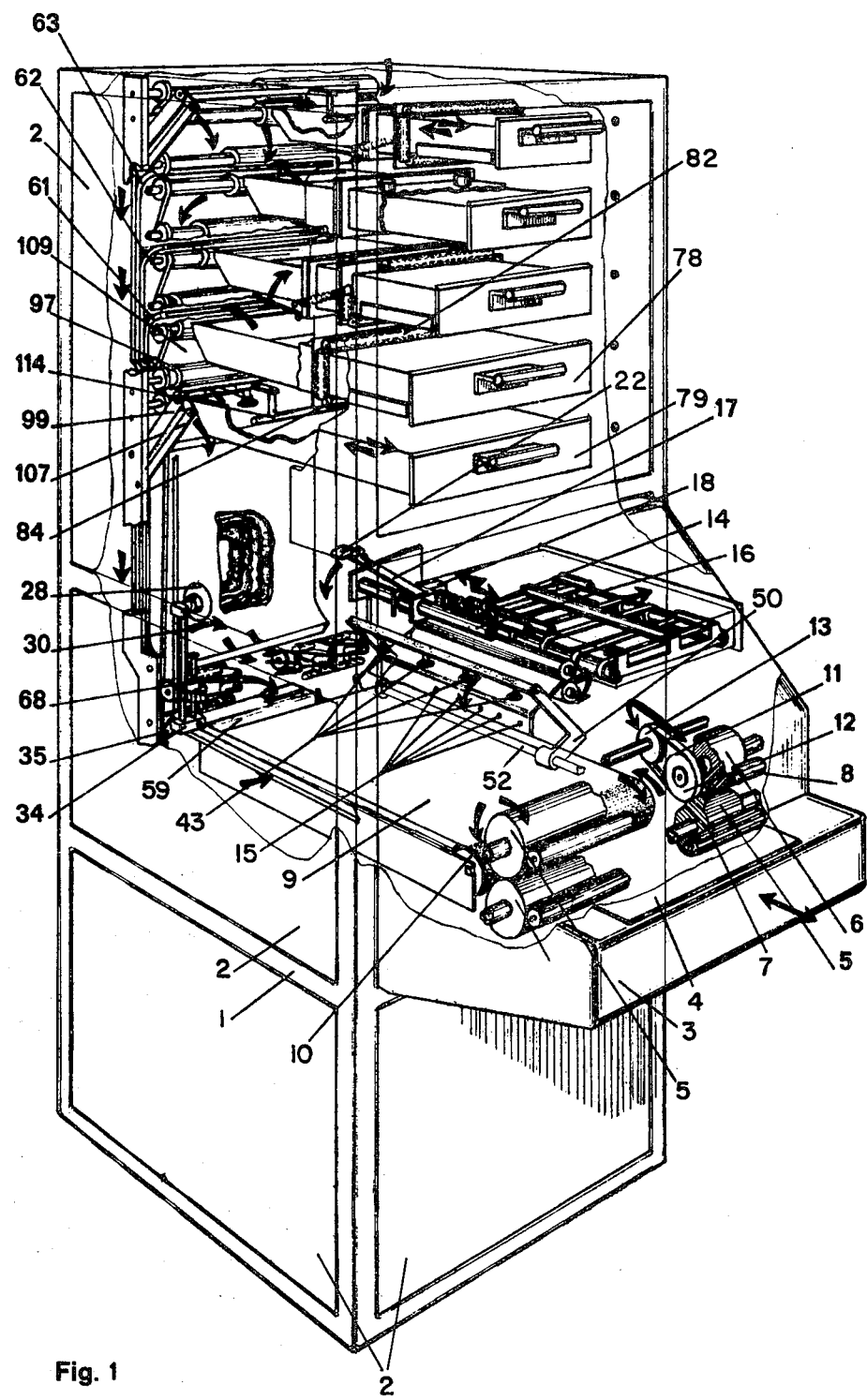
FIG. 1 represents a partial cutaway of the whole machine, in perspective view.
Figure 2:
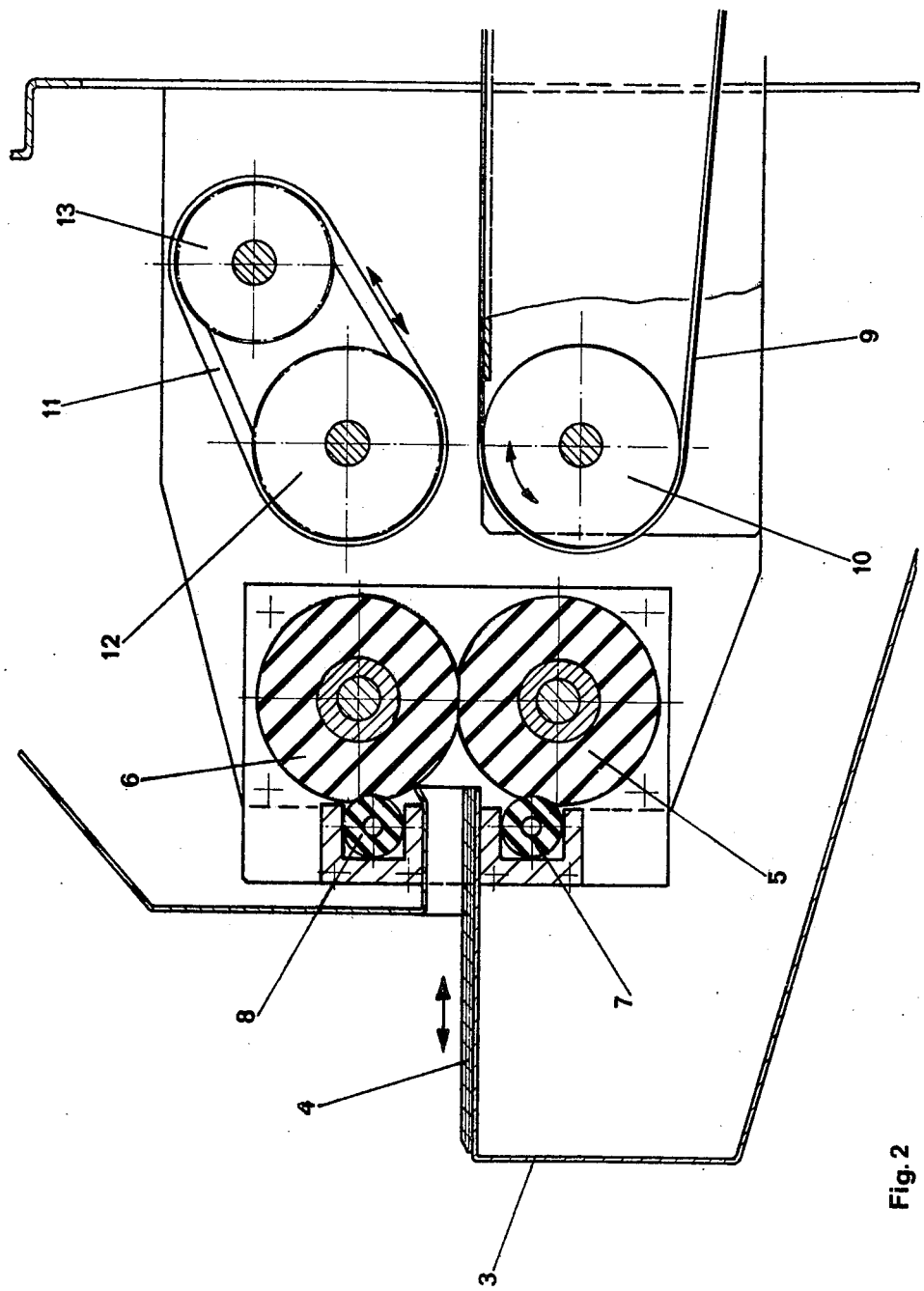
FIG. 2 represents a lengthwise section of the plane and the input-output station of the cassette, with the devices introducing and ejecting same.
Figure 3:
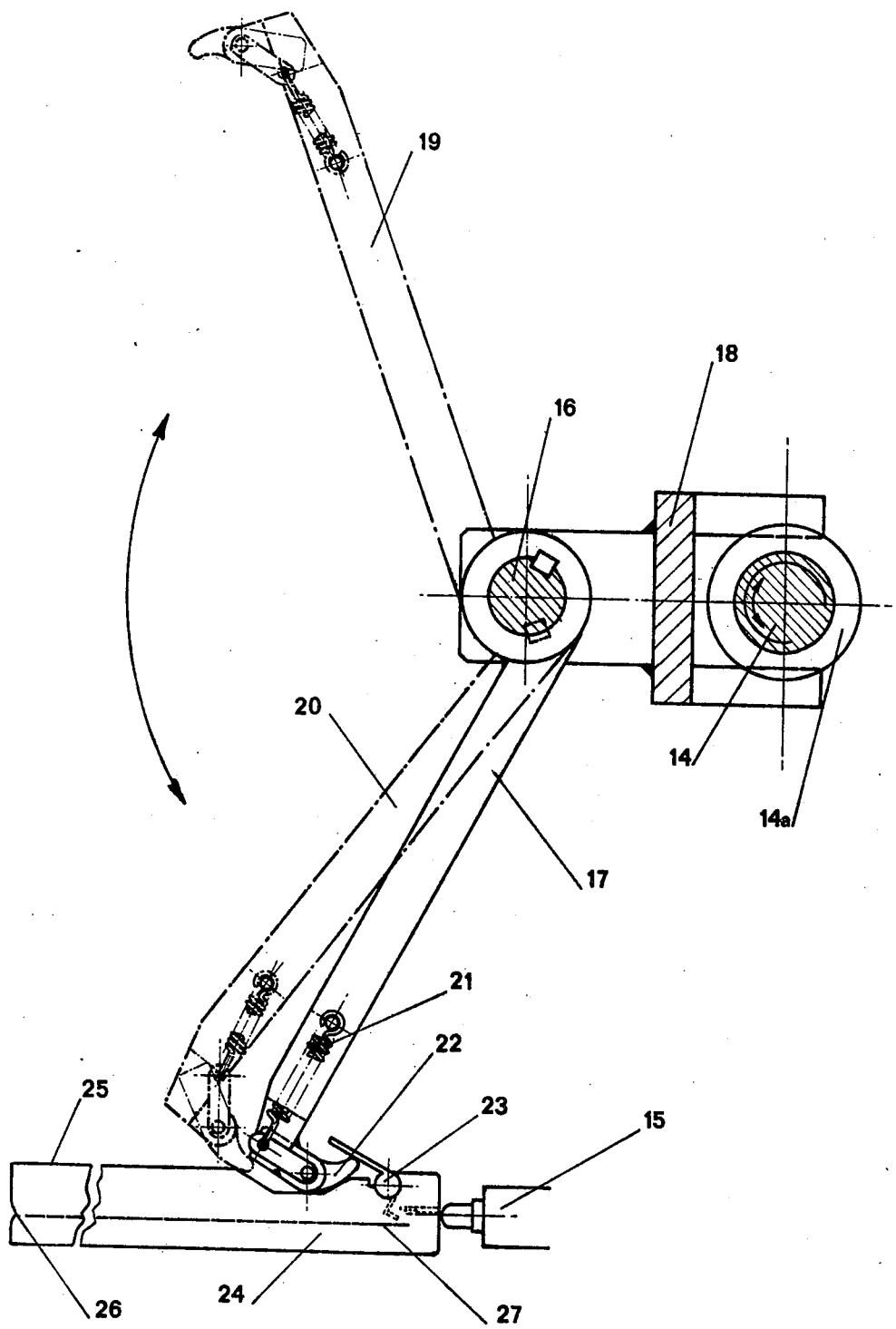
FIG. 3 represents a frontal view of the unlocking device of the cassette lock.

With reference to these figures and in particular to the FIGS. 1, 2, 3, with 1 has been indicated the machien frame, which is closed all around by panels 2 with hermetic seal against light, and shows on the frontside one loading plane 3 supplied with a supporting surface 4 for the introduction of the cassettes 24, containing the exposed plate, into the machine and for taking off the reloaded cassettes from the machine. This supporting surface 4, detects the presence of the cassette 24 for reasons, which will be explained afterwards.

At the height of the loading plane 3 there can be found the input station of the cassettes into the machine, including a pair of soft rubber rollers, 5 and 6, rotating in opposite directions and suited to determine the introduction into and the ejection of the cassettes from the machine. Moreover, there are two auxiliary idle rollers 7 and 8, which are tangent to rollers 5 and 6, respectively, to ensure perfect protection against light between the inside of the machine and the loading point 3.

Immediately after the rollers 5 and 6 there is a continuous band conveyor 9 suited to receive the cassettes coming from the rollers 5 and 6 and to convey same to the unloading and reloading station, as will be explained below in a more detailed manner. It is operated by a driving roller 10, which is supported by the machine frame 1.

Figure 4:
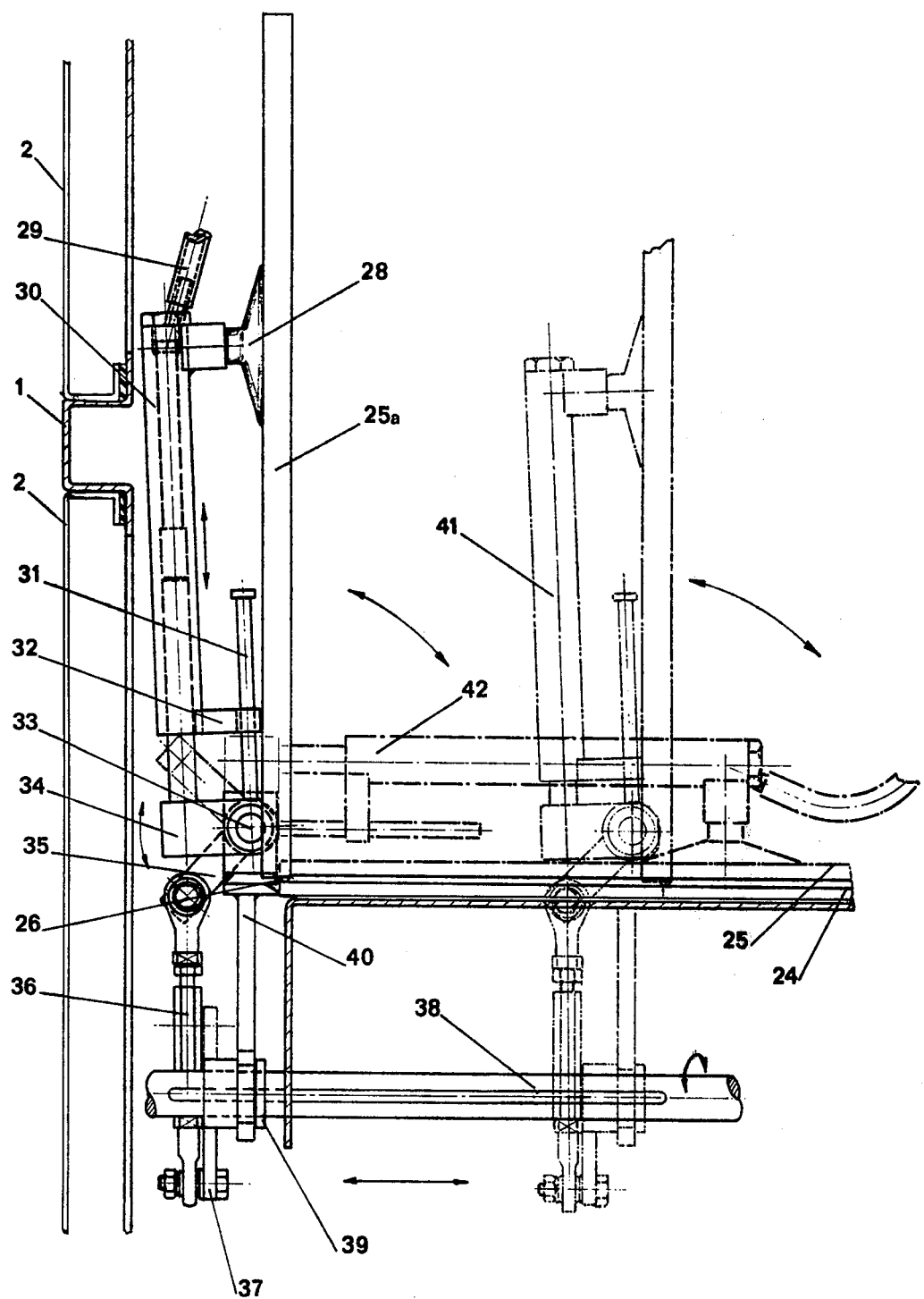
FIG. 4 represents a frontal view of the cassette opening device.

At the rear end of the continuous belt conveyor 9 there is a first frontal stop 59 to stop the cassettes, which had been conveyed into the machine, which is also provided with a microswitch — not visible on the drawings suitable to stop the continuous conveyor 9, when the desired cassette gets in touch frontally with stop 59. With reference to FIGS. 1, 4 and 5 on the left side of the machine, according to FIG. 1, there is foreseen the pushing device to turn cassette 24, after having same reached the frontal stop 59 in such a position to be operated by the opening device of same.

This pushing device, see FIGS. 4 and 5, includes a support 40, running on two shafts 38 and 38a, which are supported by the machine frame and supplied with a nut-screw 40a which is mating with the driving screw 38b so to be in a position to rotate into the two directions, through which it is possible to obtain the sliding of support 40, along the beforesaid shafts 38 and 38a until reaching the max. position 41 for small size cassettes. This support 40 touches the cassette during its movement, and pushes it against a second stop, made up by a range of microswitches 15, conveniently located to control the stopping of screw 38b and thus of support 40 as well as for detecting the size of the cassette 24, according to its longitudinal dimension, for reasons which will be explained afterwards.

The devices for opening cassette 24, see FIGS. 3 and 4, are composed of a swinging arm 17, supplied with an unlocking lever 22, which can operate on the closing hook 23 of cassette 24 to unlock the same. One swinging arm 30 is supplied with at least one sucker 28, connected through tube 29 with a vacuum pump, to operate on the cover 25 of the cassette 24 to open it. The beforesaid arm 17 is fitted slidingly on shaft 16 which is supported conveniently by the machine frame and driven, so as to rotate alternating around its own axis to bring successively the arm 17 from the rest position 19 to the position 20, where the unlocking lever 22 starts and then operates on hook 23, that closes the cassette, until obtaining the unlocking of same. The arm 17 is operated, moveover, by a fork 18 supplied with a nut-screw 14a, which mates with screw 14 supported by the machine frame and driven so as to be in a position to rotate into the two directions and to obtain consequently the sliding of arm 17 on shaft 16 in the two directions, so as to position this arm in front of the cassette hook 23. The unlocking lever 22 is articulated as an equalizer at the end of arm 17 and is operated by a spring 21, suited for keeping same in the position of starting intervention on hook 23.

The swinging arm 30, which shall be preferably composed of several telescopic elements to allow the regulation of its length, is linked at the lower end to arm 34, articulated on pin 33, overhanging from the machine frame, with which is integral another arm 35, connected through tie rod 36 and lever 37, linked at one end through the coupling 39 to shaft 38 in order to rotate together with the latter. Shaft 38 is driven in such a way as to rotate alternating around its axis, and according to this rotation can be obtained the rotation of arm 30 around pin 33 until reaching position 42, where the suckers 28 get in touch with cover 25 of cassette 24, and then the return of the arm 30 into the starting position with cover 25 in position 25a. Arm 30, moreover, is supplied with a tie 32, sliding on guide 31 to avoid accidental rotation of the external element of arm 30 and thus a wrong positioning of sucker 28 with respect to cover 25 of cassette 24.

With reference to FIGS. 1 and 6 will be described now the device for taking off the film from cassette 24, indicated on FIG. 6 with 44, and to transfer same on a continuous belt conveyor 48, placed inside the tunnel 49 with hermetical protection against light, and which can be connected with one of the well known apparatuses for developing of the exposed plate which are not shown in the present drawings. This device is made up of several suckers 43, which are connected with a vacuum pump which is connected with a frame formed bilaterally by a pair of square levers 50, which are fitted by means of a coupling with shaft 52, supported by the machine frame and connected through arm 51 with tie rod 58, which is operated by mechanisms which provide in due time the translation movement in the two directions to obtain consequently the alternating rotation of shaft 52 and and thus of levers 50, to bring the suckers 43 from the rest position into the position for taking off the plate 44 from the open cassette 24, and afterwards to bring them back into the starting position, which corresponds to the plate 44 transfer from cassette 24 into position 45, where this plate is pressed by two rollers 46 and 47, rotating in opposite directions, which provide to forward it on the continuous belt conveyor 48. During this movement it is necessary that the suckers 48 keep their suction surface in horizontal position avoiding any kind of oscillations, and for this purpose there is foreseen for each lever 50 a pair of arms 56 and 56a, mutually articulated at 54, where arm 56a is fitted on point 53 on an axle fixed on the machine frame, which form together with lever 50 an articulated parallelogram, that allows to keep the suckers 43 with perfectly horizontal suction surface during the above movement.

With reference to FIGS. 1, 7, 8 and 9 will be described hereafter the devices which are foreseen for the storage of the plates to be exposed, of several dimensions, in the machine for selecting among same the one to use for reloading the cassette 24 from where precedently had been taken off one exposed plate to be conveyed to the developer and for transfering this plate into cassette 24.

The machine is provided in the here described case with a range of 5 magazine drawers for plates, of which two are indicated on FIG. 1, with 78 and 79, each of which, as one can see on FIG. 8, is supplied with a sliding cover 80, whose opening and closing respectively when a cassette is introduced into the machine or ejected, is obtained by a pair of rollers 81, 83 or 82, 84, which are supported by the machine frame and which are operating by friction respectively on the bottom of the drawer or on the cover itself. Packings 85 or 86 ensure the protection against light between the covers 80 and the closing panels of the machine. Rollers 81, 83 or 82, 84, moreover, perform together with other rollers which operate at the sides of the drawers, protections against light, so that the plates do not suffer any alteration when the drawer is opened inside the machine.

Observing again FIG. 8, it can be seen that for each magazine drawer, as indicated with 78 and 79, there is foreseen inside the machine and after the packings 85 and 86 a door 91 or 92, hinged at point 95 or 96 on the machine frame and operated by the springs 93 or 94, which keep them in the position of closure of this space, and more precisely, in the position where it mates with some packings with absolute light protection 87, 88 and 89, 90. To these magazine drawers, such as 78 and 79 are leading the correspondent feeding ducts 60, 61, 62, 63 and 64 for the forwarding of the plates, which have been taken off from the magazine drawers to cassette 24, whose output opening is placed over several transport belts 65, which are placed around the correspondent transmission pulleys, which provide through roller 66 for conveying and introducing the plate received from one of the beforesaid feeding ducts and thus to the inside of cassette 24. Belts 65 and roller 66 are supported by a frame formed by arms 73, 74, 75 76, articulated on shaft 77 and operated by tie rod 72, connected with a mechanism, that is not visible on the drawings, and is suited to give same an alternating movement in due time, which provokes the alternating rotation of this frame around shaft 77 and the positioning of belts 65 and roller 66, in such condition to receive the plate, which is arriving from the feeding ducts 60 to 64 and to introduce same into the cassette 24, and in rest position, indicated with 67 for the belts and with 68 for the roller. Belts 65 receive the movement from some movers of the machine through pulley 70, on which is put the driving belt 69, which is wound also on the second pulley 71 that is splined on the shaft driving belts 65.

By observing FIG. 8, it can be seen that on each magazine drawer such as 78 and 79, for the plate take off, there is foreseen at least one sucker 97, supported by a frame that is formed bilaterally by an arm 99, hinged at 98 on the machine frame and operated by spring 101, which makes it rest against pin 102, which is integral with a circular sector 100, rotating around pin 98, hinging arm 99. This circular sector is fitted on point 104, or when referred to the other drawer on 105, on rod 103 moving in due time in the two directions, according to the control coming from the moving mechanism, which cannot be seen in the drawing, to make rotate alternatingly sector 100 and thus through pin 102 of spring 101 and arm 99 to bring the suckers 97 from their position inside a given magazine drawer to the utmost external position from this drawer, as indicated with 111, to which corresponds the transfer of a plate taken off from the storage drawer to the rollers, such as 112 and 113, which introduce it into the relevant feeding duct from 60 to 64. During this movement it is necessary that the suckers 97 keep their suction surface in a perfectly horizontal position and for this purpose there are foreseen, for each arm 99 two arms 107 and 110, which are reciprocally articulated at 108 and whose arm 107 is pivoted at 106 on the machine frame and arm 110 fitted in 109 on the suckers support 97. Arms 99, 107 and 110 form with such articulation a parallelogram which ensures that the suction surface of the suckers 97 is kept perfectly horizontal during the above movement. Each sucker 97 is supplied with a sensing finger 114 which limits the lowering of the suckers to the right distance from the plate to be taken off, and overcoming, if necessary, the counteracting of spring 101, which has the tendency of keeping arm 99 pushed against the relevant rest pin 102. As can be seen from FIG. 8, the front wall 115 or 117 of the drawers, such as 78 and 79 is sloping, to be quite parallel to the trajectory of the suckers 97 during their displacement from the position inside the drawers to the position for feeding the plate that had been taken off from the rollers 112, 113, to avoid any interference with the plate itself, whilst the rear wall 116 or 118 is parallel to the frontal one, to avoid disorder of the plate pile which is inside the drawer. The suckers 97, which are relevant to all the magazine containers, such as 78 and 79, are connected with a vacuum pump, and the suckers of each magazine drawer can be activated according to the firing of one or more microswitches 15, which are activated by cassette 24 during the phase when same is prepared for being operated by the opening devices for the cover to take off the exposed plate; and more precisely, according to the number of microswitches, which are involved by cassette 24 according to its longitudinal dimension, the suckers 97 relevant to the magazine drawer containing the plates corresponding to the cassette 24 are activated.

Each magazine drawer such as 78 or 79 is supplied, moreover, with a lateral stop 119 or 119a, composed of a knurled roller, which can rotate eccentrically with respect to its axis, controlled by lever 120 and 120A, in order to push laterally against the pile of plates contained in the magazine drawers to keep behind all the plates under the first one, when the suckers 97 take off same from the drawer itself.

With reference to the above will be now described the operating of the machine, considering the following starting condition: rollers 5 and 6 and the first conveyor 9 are stopped; arms 17 and 30 are respectively in position 19 and in rest position; the device for taking off the plate to be unloaded from the cassette 24 is in rest position; the supporting frame for the belts 65 and roller 66 are in such a position that same are in position 67 and 68, respectively; the devices for selecting the plates from the magazine drawers are in rest position. The machine operates as follows: Cassette 24 shall be laid on the surface 4 of the loading plane 3, and shall be pushed in direction of the inside of the machine. Rollers 5 and 6, which start moving by means of a control, which is not visible on the drawings and which are sensitive to the introduction of the cassette, push cassette 24 onto the belt conveyor 9, which leads it against the longitudinal stop 59, where a microswitch operates the moving of screw 38b, the device for the cassette 24 opening, pushing some contemporaneously against the sensing fingers of microswitch 15, which stops screw 38b.

Now cassette 24 is positioned in transversal direction with respect to the machine. The involved microswitch 15, further to controlling the stopping of screw 38b, controls the starting of screw 14, which by means of the nut screw 14a and fork 18 position arm 17 with respect to hook 23, which keeps the cassette 24 closed. Now shaft 16 starts rotating, which transfers the rotation to the lower part of the arm 17, starting with position 19 until reaching the position where the unlocking lever 22 has been introduced under hook 23 of cassette 24, unlocking same. Now shaft 16 reverses the direction of rotation and arm 17 goes back into rest position 19. Now shaft 38 carries out one revolution and through lever 37, tie rod 36, arms 35 and 34 and the telescopic arm 30, it controls the lowering of the sucker 28 (position 42 of the telescopic arm 30). As soon as sucker 29 gets in touch with cover 25 of cassette 24, a vacuum is formed in the sucker and cover 25 becomes integral with the sucker itself. Now shaft 38 rotates in opposite direction, determining the raising of the arm from position 42 into the starting position. Consequently, due to the operating of the sucker 28 also the cassette cover, by rotating around 26 goes from the position of "cassette closed" into position 25a, where it remains until the exposed plate has been replaced by a new one. As soon as sucker 28 has brought the cover of the cassette into position 25a, tie rod 58 is displaced upwards, controlling through arm 51 the consequent rotation of the square lever 50; by this way suckers 43 get in touch with plate 44. Inside the suckers 43, the vacuum is formed, tie rod 58 goes downwards and suckers 43 bring the plate 44 into position 45, that is, taken by rollers 46 and 47. At this stage the vacuum inside the suckers 43 stops and rollers 46 and 47 convey the plate to the belt conveyor 48, which unloads it in the developer (not illustrated) through tunnel 49, with perfect light insulation. While plate 44 is taken off from the cassette 24, rod 103 goes upwards and controls through pins 104 and 105 of the sectors 100, as well as through arms 99, the movement of suckers 97, until each sensor 114 rests on the pile of plates placed inside the relevant magazine drawer. At this stage according to the dimensions of the cassette, which are detected through microswitches 15 and the position of support 40 to the vacuum is formed in the suckers 97 relevant to the magazine drawer containing the plates whose size corresponds to the considered cassette 24. Afterwards rod 103 goes downwards, provoking the raising of all the suckers 97, but only the chosen plate is raised and sent towards rollers 112 and 113, which do introduce it into the relevant duct from 60 to 64, through which it is sent to the transport belts 65, which after the opening of the cassette cover, owing to the movement of the tie rod 72, had been brought from their rest position 67 into the suitable position to receive the plate. These belts put the chosen plate into cassette 24, by means of roller 66. An electrovalve, which is not indicated on the drawings, takes off the vacuum from sucker 28 and the cassette cover is lowered by gravity, closing the cassette 24. Then the whole group for the raising of cover 25 is displaced on the left side into rest position, owing to the action of the conveniently driven screw 38b, and at the end of this phase the belt conveyor 9, after having reversed its moving direction with respect to the one of transfer of cassette 24 inside the machine, starts the phase of the cassette ejection.

One roller 12, together with a belt 11 (see FIG. 1) operating on hook 23 for the cassette 24 closure, locks the cover, while rollers 5 and 6, after having reversed the direction of rotation, complete the ejection of the cassette 24, loaded with a new cassette 24, to repeat the working cycle.

I claim:

1. Automatic machine for receiving a cassette with an exposed plate, having any of a wide variety of sizes, opening the cassette, unloading the exposed plate, reloading with an unexposed plate of appropriate size, and closing and ejecting the cassette, comprising:
  a loading plane, including first sensor means for detecting the presence of a cassette thereon, and further including input and output station means, which contain a means for hermetic protection against light, for gripping and conveying the cassettes inside the machine when the presence of a cassette is detected by said first sensor means and for taking the cassettes out of the machine;
  a first conveyor means, placed behind said input and output station means, for receiving the entering cassette and for transferring the cassette inside the machine;
  control means, including a first stop, for stopping the movement of said first conveyor means and for changing the direction of said first conveyor means to supply said input and output station means with the reloaded cassette during the phase of ejection of the cassette from the machine;
  a pushing means for the positioning of the cassette in orthogonal direction with respect to the moving direction of the cassette on said first conveyor means;
  second sensor means, placed laterally to said first conveyor means for determining the span of said pushing means and for detecting the lateral dimension of the cassette;
  unlocking means for unlocking of the cassette, placed above said first conveyor means, the operation of said unlocking means being controlled by said second sensor means;
  opening means, operating in synchronization with said unlocking means, for rotating the cassette cover from the originally closed position into the open position of the cassette, said opening means including first suckers;
  plate removing means for taking off the exposed plate, from inside the cassette, said plate removing means being timed with said opening means and including second sucker means for taking the plate out of the cassette and transferring the plate onto a second conveyor means, placed inside a tunnel with hermetic protection against light, for the output of the plate from the machine;
  a plurality of magazine drawers for storing plates to be forwarded singly to the cassettes, from where the exposed plate had been previously taken off;
  a plurality of feeding ducts, each having an inlet corresponding to one of said magazine drawers;
  a plurality of plate transfer means, one corresponding to each of said magazine drawers, for taking a plate from one of said magazine drawers and transferring the plate to the corresponding one of said feeding duct inlets, each of said plate transfer means including second suckers to hold the plates, the particular plate transfer means which is activated, corresponding to the desired magazine drawer, being controlled by said second sensor means and the position of said pushing means;
  loading means for transferring the plate from said feeding ducts to the open cassette; and
  closing means for closing and locking the cover of the cassette, thereby preparing the reloaded cassette for ejection by said input and output station means.

2. Automatic machine according to claim 1, further including, for each said magazine drawer, at least one plate-holding means, placed inside said drawer on one side, for offering the possibility of being positioned in such a way as to push laterally on the plate pile contained in said magazine drawer.

3. Automatic machine according to claim 1, wherein each said plate transfer means includes a third sensor means for detecting the height of the pile of plates contained in said magazine drawer, said third sensor means being placed in such a way as to limit the span of said second suckers during their movement towards the suction position of the first plate of the pile contained in said magazine drawer, which span is dependent on the height of the pile itself.

4. Automatic machine according to claim 1, wherein said input and output station means include rollers made of soft rubber, suited to follow exactly the shape of the cassettes during the conveying into the machine or the ejection from the machine so as to ensure perfect light seal.

5. Automatic machine according to claim 1, wherein said loading means includes a mobile frame, which is timed with said opening means, said frame being adapted to take a position where said loading means is placed with its output over the open cassette and in front of said first stop to transfer these plates into the cassette, or to take a rest position, which is more backwards with respect to the said first stop.

6. Automatic machine according to claim 1, wherein said closing means include locking means for locking the cover of the cassettes, placed at said input and output station means, above the first conveyor, said locking means being placed in such a way as to push the closing hook of the cassette in contrast with said first conveyor means.

7. Automatic machine according to claim 1, wherein each of said magazine drawers include a sliding cover, and further including a plurality of light sealing means, one corresponding to each of said magazine drawers, for sealing the interior of the machine against the entrance of light when said magazine drawers are being inserted and removed, each of said light sealing means operating by friction around the perimeter of each said magazine drawer and serving to cause, by friction, said sliding cover to open when the magazine drawer is inserted and to close when removed, each said light sealing means further including a door, operated by spring means biased to keep the door in a closed position, thereby protecting the magazine space against light, said door being placed in such a way to be operated by the insertion of said magazine drawer after having been inserted past the perimeter portions of said light sealing means.

* * * * *